United States Patent
Touhara et al.

(10) Patent No.: US 6,444,736 B1
(45) Date of Patent: Sep. 3, 2002

(54) FLAME RETARDANT POLYOLEFIN COMPOSITION

(75) Inventors: Mitsuhiro Touhara; Akira Yamauchi, both of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/673,849

(22) PCT Filed: Apr. 20, 1999

(86) PCT No.: PCT/JP99/02082

§ 371 (c)(1),
(2), (4) Date: Oct. 23, 2000

(87) PCT Pub. No.: WO99/55776

PCT Pub. Date: Nov. 4, 1999

(30) Foreign Application Priority Data

Apr. 24, 1998 (JP) ............................................. 10-131112

(51) Int. Cl.⁷ ............................. C08K 3/32; C08L 23/10
(52) U.S. Cl. ........................... 524/127; 524/96; 524/100
(58) Field of Search ......................... 524/127, 96, 100, 524/710, 719, 720, 528

(56) References Cited

U.S. PATENT DOCUMENTS

| | | | |
|---|---|---|---|
| 4,966,931 A | 10/1990 | Akitaya et al. | 524/100 |
| 5,047,485 A | 9/1991 | DeNicola, Jr. | 525/387 |
| 5,476,903 A | 12/1995 | Shinozaki et al. | 525/232 |

FOREIGN PATENT DOCUMENTS

| | | |
|---|---|---|
| EP | 0326082 A2 | 8/1989 |
| EP | 0534119 B1 | 3/1993 |
| JP | 52-146452 | 12/1977 |
| JP | 54-22450 | 2/1979 |
| JP | 59-93711 | 5/1984 |
| JP | 61-28694 | 7/1986 |
| JP | 61-152754 | 7/1986 |
| JP | 62-25106 | 2/1987 |
| JP | 62-61057 | 12/1987 |
| JP | 1-12770 | 3/1989 |
| JP | 1-193347 | 8/1989 |
| JP | 2-298536 | 12/1990 |
| JP | 4-55410 | 2/1992 |
| JP | 5-222122 | 8/1993 |
| JP | 5-79683 | 11/1993 |
| JP | 5-339437 | 12/1993 |
| JP | 6-275135 | 9/1994 |
| JP | 7-8890 | 2/1995 |
| JP | 8-217910 | 8/1996 |
| JP | 10-231397 | 9/1998 |
| JP | 10-231398 | 9/1998 |
| JP | 10-287707 | 10/1998 |

Primary Examiner—Christopher Henderson
(74) Attorney, Agent, or Firm—McDermott, Will & Emery

(57) ABSTRACT

The invention is a flame-retardant polyolefin composition that comprises 100 parts by weight of a propylene homopolymer or a propylene-ethylene copolymer containing at least 50% by weight of propylene polymer units, and from 0.01 to 5 parts by weight of a polyethylene having an intrinsic viscosity $[\eta]$ of from 15 dl/g to 100 dl/g, and contains a non-halogen flame retardant.

8 Claims, No Drawings

FLAME RETARDANT POLYOLEFIN COMPOSITION

TECHNICAL FIELD

The present invention relates to a flame-retardant polyolefin composition. Precisely, it relates to a composition of good flame retardancy, which comprises a specific polypropylene composition and a flame retardant not containing a halogen atom (hereinafter referred to as a non-halogen flame retardant) added thereto.

More precisely, the invention relates to a flame-retardant polyolefin composition having the advantages of high melt tension, good retention of shape even in burning, much improved flaming drip resistance (flaming drip is meant to indicate the property of resin that will drip when burned according to the vertical burning test of UL94), generation of neither corrosive gas nor toxic gas, good moldability, and good mechanical strength of its moldings.

BACKGROUND ART

The resin for electric appliances shall be a non-combustible resin, a flame-retardant resin or a self-extinguishable resin for protecting them from ignition, combustion or firing to be caused by some electric troubles, and any of such resins are used in producing electric appliances depending on their necessary properties. In particular, polypropylenes are much used for electric appliances, as having the advantages of good impact resistance, stiffness, appearance and moldability, and various proposals have been made for flame retardation of such polypropylenes. Specifically, as in the United States UL Standards (Underwriters Laboratories Incorporation; UL Subject 94), the products themselves or the indicated members of electric appliances are required to have high flame retardancy. For exports to the United States, therefore, the materials must satisfy the requirements stipulated in the UL Standards. Not only in the United States but also in Japan and many other countries including West European countries, electric appliances are required to have high-level flame retardancy. To meet the requirements, various flame-retardant polypropylene resin compositions have been proposed.

Compositions containing a halogen compound that serves as a flame retardant therein generally have good moldability and their moldings have relatively high mechanical strength, and their moldings have high-level flame retardancy, but are problematic in that they often generate corrosive gas and toxic gas while molded or when burned.

Japanese Patent Laid-Open No. 147050/1984 discloses a flame-retardant polypropylene resin composition that contains an ammonium polyphosphate and a triazine compound both serving as a flame retardant therein. The composition has the advantages of good moldability and high mechanical strength of its moldings, and, while molded or when burned, it does not generate so much harmful gas. However, in the vertical burning test of UL Subject 94, "Flammability Test for Plastic Materials for Machine Members" (hereinafter referred to as UL94 burning test), the resin composition disclosed is in the rank V-2 for combustion resistance of 1/32 inch-thick test pieces, and can hardly clear the high-level flame retardancy for the rank V-0.

For increasing the flaming drip resistance of polypropylene compositions, it may be taken into consideration to increase and elevate the melt tension and the crystallization temperature of the compositions. For increasing and elevating the melt tension and the crystallization temperature of polypropylene compositions, disclosed are a method of reacting a crystalline polypropylene, while in melt, with an organic peroxide and a crosslinking agent (Japanese Patent Laid-Open Nos. 93711/1984, 152754/1986, etc.); a method of reacting a semi-crystalline polypropylene with a peroxide having a low decomposition temperature, in the absence of oxygen, to produce a polypropylene having free long-chain branches and not containing gel (Japanese Patent Laid-Open No. 298536/1990), etc. Apart from these, other methods have been proposed for increasing the melt viscoelasticity including melt tension of polypropylene compositions by formulating different types of polyethylene or polypropylene that differ in the intrinsic viscosity or in the molecular weight, or by producing the compositions through multi-stage polymerization.

For example, disclosed are a method of producing a composition by adding from 2 to 30 parts by weight of an ultra-high-molecular-weight polypropylene to 100 parts by weight of an ordinary polypropylene followed by extruding the resulting mixture at a temperature falling within a range between the melting point of the mixture and 210° C. (Japanese Patent Publication No. 28694/1986); a sheet produced through extrusion of a two-component polypropylene composition which is prepared in a multi-stage polymerization process and in which the two polypropylene components each have a different molecular weight and the limiting viscosity ratio of the two is at least 2 (Japanese Patent Publication No. 12770/1989); a method for producing a polyethylene composition that comprises three different types of polyethylene each having a different viscosity-average molecular weight and contains from 1 to 10% by weight of high-viscosity, high-molecular-weight polyethylene in a process of melt-kneading or multi-stage polymerization (Japanese Patent Publication No. 61057/1987); a method for producing a polyethylene composition that contains from 0.05 to less than 1% by weight of an ultra-high-molecular-weight polyethylene having an intrinsic viscosity of at least 20 dl/g, through multi-stage polymerization in the presence of a high-activity titanium-vanadium solid catalyst component (Japanese Patent Publication No. 79683/1993); a method for producing a polyethylene composition that contains from 0.1 to 5% by weight of an ultra-high-molecular-weight polyethylene having an intrinsic viscosity of at least 15 dl/g, through multi-stage polymerization in a specific series of polymerization reactor units in the presence of a high-activity titanium catalyst component having been processed for prepolymerization with 1-butene or 4-methyl-1-pentene (Japanese Patent Publication No. 8890/1995), etc.

Also disclosed are a method for producing a polypropylene having high melt tension through polymerization of propylene in the presence of a pre-activated catalyst that comprises a titanium-containing solid catalyst component held on a carrier and an organoaluminium compound component and has been processed for prepolymerization with ethylene and a polyene compound (Japanese Patent Publication No. 222122/1993); and a method for producing a polyethylene-containing ethylene-α-olefin copolymer having an intrinsic viscosity of at least 20 dl/g through copolymerization in the presence of a pre-polymerized catalyst of the same type as above but having been processed for prepolymerization with ethylene alone (Japanese Patent Laid-Open No. 55410/1992).

The above-mentioned proposals for polyolefin compositions and for methods of producing them will be effective for increasing the melt tension of polyolefin compositions in some degree, but are still problematic in that the crosslinked products of the polyolefin compositions proposed are not recyclable and are not stiff at high temperatures. Another problem with the polyolefin compositions containing high-viscosity polyethylene is that the motor load current to be applied to molding machines for them shall increase and the electric power to be consumed for molding them shall therefore increase, and that their productivity and thermal stability are low. These problems with the polyolefin compositions proposed must be solved.

The multi-stage polymerization method in which the step of producing a minor amount of a high-molecular-weight polyolefin is integrated with the essential step of ordinary olefin polymerization is problematic in that it is difficult to delicately control the production condition in forming such a minor amount of a high-molecular-weight polyolefin, and that the method requires a low polymerization temperature for forming such a polyolefin having a satisfactorily high molecular weight. To solve the problems, the apparatus for the process must be modified or changed, and, in addition, the productivity of the final polyolefins lowers.

For the method of processing polymerization catalysts through pre-polymerization with a polyene compound, the polyene compounds must be separately prepared. In the method where a polymerization catalyst is first processed through pre-polymerization with ethylene and thereafter propylene is finally polymerized in the presence of the catalyst, polyethylene produced in the pre-polymerization step will poorly disperse in the finally-produced polypropylene composition. The problem with the method shall be solved to improve the homogeneity of the final polypropylene composition in the method.

As so mentioned hereinabove, the prior art techniques are all unsatisfactory for increasing the melt tension of polypropylenes. Up to the present, no one has found out satisfactory flame-retardant polypropylene compositions capable of ensuring good retention of shape even when burned and good flaming drip resistance in the UL94 burning test, and having good stiffness and good moldability not generating corrosive or toxic gas while molded or when burned. Given that situation as above, we, the present inventors have made the invention disclosed herein. The invention is to provide a flame-retardant polypropylene resin composition of which the mechanical properties are at least on the same level as that of ordinary polyolefins and which can ensure good retention of shape and good flaming drip resistance when burned, not generating corrosive gas or toxic gas while molded or when burned.

DISCLOSURE OF THE INVENTION

We, the present inventors have assiduously studied so as to obtain a flame-retardant polyolefin composition still ensuring the mechanical characteristics intrinsic to polypropylenes and having the advantages of good retention of shape and flaming drip resistance in burning, not generating corrosive or toxic gas while molded or when burned. As a result, we have found that a flame-retardant resin composition comprising a polypropylene composition (A) which comprises a propylene homopolymer or a propylene-ethylene copolymer having at least 50% by weight of propylene polymer units (hereinafter referred to as a component (a)) and contains a specific amount of a polyethylene having a specific intrinsic viscosity (hereinafter referred to as a component (b)) added thereto, or a propylene homopolymer or a propylene-olefin copolymer obtained through copolymerization of propylene or propylene and an olefin in the presence of a specifically pre-activated catalyst for polypropylene production and to which is added a specific amount of a polyethylene having a specific intrinsic viscosity, and containing a flame retardant with no halogen atom therein, a so-called non-halogen flame retardant has the intended properties. On the basis of this finding, we have completed the present invention.

The invention is indicated by the followings:

(1) A flame-retardant polyolefin composition (C) comprising, as the base resin, (A) a polypropylene composition which comprises;
  (a) 100 parts by weight of a propylene homopolymer or a propylene-ethylene block copolymer containing at least 50% by weight of propylene polymer units, and
  (b) from 0.01 parts by weight to 5 parts by weight of an ethylene homopolymer or an ethylene-olefin copolymer containing at least 50% by weight of ethylene polymer units, which has an intrinsic viscosity [$\eta$E] falling between 15 dl/g and 100 dl/g,
  and which has a melt flow rate (hereinafter referred to as MFR) falling between 0.1 and 50 g/10 min (at 230° C. under 21.18 N), a melting point (Tm) falling between 150 and 167° C., a density falling between 0.895 and 0.910 g/cm$^3$, and a melt tension at 230° C. falling between 1 cN and 20 cN, and (B) a non-halogen flame retardant added to the base resin.

(2) A flame-retardant polyolefin composition comprising, as the base resin, (A) a polypropylene composition which comprises;
  (a) 100 parts by weight of a propylene homopolymer or a propylene-olefin copolymer containing at least 50% by weight of propylene polymer units, which is prepared through homopolymerization of propylene or copolymerization of propylene with an olefin having from 2 to 12 carbon atoms in the presence of a pre-activated catalyst for polyolefin production which comprises a combination of [AL1] a transition metal compound component at least including a titanium compound, and from 0.01 to 1,000 mols, relative to one mol of the transition metal atom, of an organometal compound with a metal selected from a group of metals belonging to the Group 1, Group 2, Group 12 and Group 13 of the Periodic Table, and [Ed1] from 0 to 500 mols, relative to one mol of the transition metal atom, of an electron donor, and which contains;
    (a-P) from 0.01 to 100 g, per gram of the transition metal compound component held on the catalyst, of a polypropylene having an intrinsic viscosity [$\eta$] of smaller than 15 dl/g, and
    (a-E) from 0.01 to 5,000 g, per gram of the transition metal compound component, of a polyethylene having an intrinsic viscosity [$\eta$E] of from 15 to 100 dl/g, and
  (b) from 0.01 to 5 parts by weight of a polyethylene including an ethylene homopolymer or an ethylene-olefin copolymer that contains at least 50% by weight of ethylene polymer units, and having an intrinsic viscosity [$\eta$E] of from 15 to 100 dl/g, and which (A) has MFR falling between 0.1 and 50 g/10 min (at 230° C. under 21.18 N), a melting point (Tm) falling between 150 and 167° C., a density falling between 0.895 and 0.910 g/cm$^3$, and a melt tension at 230° C. falling between 1 cN and 20 CN, and (B) a non-halogen flame retardant added to the base resin.

(3) The flame-retardant polyolefin composition of any one of above (1) or (2), which has MFR falling between 4 and 50/10 min and which is for injection molding.

(4) The flame-retardant polyolefin composition of any one of above (1) or (2), which has MFR falling between 0.1 and 4 g/10 min and which is for blow molding or extrusion molding.

(5) The flame-retardant polyolefin composition of above (1), wherein the non-halogen flame retardant (B) comprises an ammonium polyphosphate combined with a 1,3,5-triazine derivative of the following general formula (1):

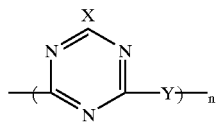

(1)

where X indicates a morphlino group or a piperidino group; Y indicates a divalent residue of piperazine; and n indicates a n integer falling between 2 and 50.

(6) The flame-retardant polyolefin composition of above (1), which contains from 12 to 25% by weight, based on the composition, of an ammonium polyphosphate, and from 5 to 10% by weight, based on the composition, of a 1,3,5-triazine derivative of formula (1) stated in above (5).

(7) The flame-retardant polyolefin composition of above (1), wherein the non-halogen flame retardant (B) comprises an ammonium polyphosphate combined with a polyamide.

(8) The flame-retardant polyolefin composition of above (1), wherein the non-halogen flame retardant (B) comprises an ammonium polyphosphate combined with expandable graphite.

(9) The flame-retardant polyolefin composition of above (1), wherein the non-halogen flame retardant (B) is an organic phosphate.

(10) The flame-retardant polyolefin composition of above (1), wherein the non-halogen flame retardant (B) is a combination of an ammonium polyphosphate and an inorganic metal hydrate.

BEST MODES OF CARRYING OUT THE INVENTION

The term "polypropylene" referred to in the invention is meant to include a propylene-olefin random copolymer and a propylene-olefin block copolymer containing at least 50% by weight of propylene polymer units, and a propylene homopolymer; and "polyethylene" herein is meant to indicate an ethylene homopolymer and an ethylene-olefin random copolymer containing at least 50% by weight of ethylene polymer units.

The polyethylene component (b) to constitute the polypropylene composition (A) for use in the invention has an intrinsic viscosity [$\eta E$] falling between 15 and 100 dl/g, preferably between 17 and 50 dl/g, including an ethylene homopolymer or an ethylene-olefin copolymer that contains at least 50% by weight of ethylene polymer units. Since its intrinsic viscosity [$\eta E$] must be at least 15 dl/g, the polyethylene is preferably an ethylene homopolymer or an ethylene-olefin copolymer containing at least 70% by weight of ethylene polymer units, more preferably an ethylene homopolymer or an ethylene-olefin copolymer containing at least 90% by weight of ethylene polymer units. This may be one or more of these (co)polymers, singly or as combined.

To obtain their intrinsic viscosity referred to herein, polyethylene and polypropylene each are measured in a tetralin solution at 135° C.

In case where the intrinsic viscosity [$\eta E$] of the polyethylene component (b) is smaller than 15 dl/g, the melt tension and the crystallization temperature of the polypropylene composition (A) containing the component (b) will be low. On the other hand, the intrinsic viscosity [$\eta E$] of the polyethylene component (b) is not specifically defined. However, if the difference between the intrinsic viscosity [$\eta E$] of the polyethylene component (b) and the intrinsic viscosity [$\eta$] of the polypropylene to be combined with it is too large, the polyethylene component (b) will poorly disperse in the polypropylene in the resulting composition whereby the melt tension of the composition will fail to increase. In view of the production efficiency in addition to it, the uppermost limit of the intrinsic viscosity [$\eta E$] of the polyethylene component (b) is preferably around 100 dl/g or so.

Olefins except ethylene that are to be copolymerized with ethylene for constituting the polyethylene component (b) are not specifically defined, but preferred are olefins having from 3 to 12 carbon atoms. Concretely, they include propylene, 1-butene, 1-pentene, 1-hexene, 1-octene, 1-decene, -4-methyl-1-pentene, 3-methyl-1-pentene, etc. Not only one but also two or more of these olefins may be copolymerized with ethylene.

The density of the polyethylene is not specifically defined. Concretely, however, it preferably falls between 0.880 and 0.980 g/cm$^3$ or so.

The polypropylene component (a) to constitute the polypropylene composition (A) for use in the invention is a polypropylene homopolymer or a propylene-olefin copolymer containing at least 50% by weight of propylene polymer units, preferably a propylene homopolymer or a propylene-olefin copolymer containing at least 60% by weight of propylene polymer units, more preferably a propylene homopolymer or a ethylene-olefin copolymer containing at least 70% by weight of propylene polymer units Not only one but also two or more of these (co)polymers may be in the composition (A).

Olefins except propylene that are to be copolymerized with propylene for constituting the propylene-olefin copolymer component (a) are not specifically defined, but preferred are olefins having 2 or from 4 to 12 carbon atoms. Concretely, they include ethylene, 1-butene, 1-pentene, 1-hexene, 1-octene, 1-decene, 4-methyl-1-pentene, 3-methyl-1-pentene, etc. Not only one but also two or more of these olefins may be copolymerized with propylene.

The polypropylene composition (A) for use in the invention comprises 100 parts by weight of the above-mentioned polypropylene component (a), and from 0.01 to 5 parts by weight, preferably from 0.10 to 2 parts by weight, more preferably from 0.2 to 1 part by weight of the. above-mentioned polyethylene component (b).

If the proportion of the polyethylene component (b) is smaller than 0.01 parts by weight, the melt tension of the resulting polypropylene composition (A) will be low, and the flaming dripping resistance thereof will be poor. If, on the other hand, the proportion of the polyethylene component (b) is larger than 5 parts by weight, the effect of the polyethylene in the resulting polyolefin composition will be saturated, and, as the case maybe, the polypropylene composition (A) containing such a large amount of polyethylene could not be homogeneous.

The melt tension of the polypropylene composition (A) falls between 1 and 20 cN, preferably between 2 and 15 cN. If the melt tension of the polypropylene composition (A) is too high, the moldability of the final composition containing the composition (A) will be poor, and, in addition, the appearance of the moldings will also be poor. Therefore, the melt tension of the polypropylene composition (A) is preferably not higher than 20 cN. On the other hand, if it is lower than 1 cN, the flaming drip resistance of the moldings of the final composition in burning will be greatly degraded.

The melt tension (MS) of the polypropylene composition is measured as follows: The polypropylene composition to be tested is put into a melt tensiometer, Toyo Seiki Seisakusho's Melt Tension Tester Model 2, and heated at 230° C. therein. The resulting melt of the polypropylene composition is extruded out through a nozzle having a diameter of 2.095 mm at a rate of 20 mm/min into air at 23° C. to be a strand, with the strand being taken up at a rate of 4.71 m/min. While being thus taken up, the tension of the strand of the polypropylene composition is measured (in terms of cN), and this indicates the melt tension (MS) of the polypropylene composition.

The stereospecificity of the polypropylene composition (A) for use in the invention is not specifically defined. Any and every crystalline polypropylene capable of attaining the object of the invention may be the polypropylene composition (A). Concretely, the composition (A) will be a crystalline polypropylene composition having an isotactic pentad fraction (mmmm) measured through $^{13}$C-NMR (nuclear magnetic resonance spectrometry) of from 0.80 to 0.99, preferably from 0.85 to 0.99, more preferably from 0.90 to 0.99.

The isotactic pentad fraction (mmmm) is an isotactic fraction in terms of pentad units in a polypropylene molecular chain measured through $^{13}$C-NMR, as so proposed by A. Zambelli et al. in Macromolecules, 6, 925 (1973). The peak assignment in spectrometry shall be determined according to the A. Zambelli et al's method proposed in Macromolecules, 8, 687 (1975). Concretely, a polymer to be measured is dissolved in a mixed solution of o-dichlorobenzene/benzene bromide=8/2 by weight to have a concentration of 20% by weight therein, and measured at 67.20 MHz at 130° C. To measure it, for example, employed is a JEOL's NMR spectrometer, Model JEOL-GX270.

The method for producing the polypropylene composition (A) is not specifically defined so far as the melt tension of the composition produced satisfies the requirement of the invention defined herein. For example, the composition can be readily produced according to a method of (co) polymerizing propylene or propylene with other olefins in the presence of a catalyst having been pre-activated with ethylene or with ethylene and other olefins. The method is described in detail hereinunder.

Precisely, the method for producing the polypropylene composition (A) comprises homopolymerizing propylene or copolymerizing propylene with an olefin having 2 or from 4 to 12 carbon atoms to give a propylene homopolymer or a propylene-olefin copolymer containing at least 50% by weight of propylene polymer units, in the presence of;

a pre-activated catalyst for polyolefin production which comprises a combination of [AL1], a transition metal compound component at least including a titanium compound, and from 0.01 to 1,000 mols, relative to one mol of the transition metal atom, of an organometal compound with a metal selected from a group of metals belonging to the Group 1, Group 2, Group 12 and Group 13 of the Periodic Table (edition in 1991), and [Ed1] from 0 to 500 mols, relative to one mol of the transition metal atom, of an electron donor, and which contains (a-E) from 0.01 to 5,000 g, per gram of the transition metal compound component held on the catalyst, of a polyethylene having an intrinsic viscosity [$\eta$E] of from 15 to 100 dl/g, and (a-P) from 0.01 to 100 g, per gram of the transition metal compound component, of a polypropylene having an intrinsic viscosity [$\eta$] of smaller than 15 dl/g. Any known catalyst and process may be applicable to the polymerization. For example, the main (co)polymerization may be effected in any mode of slurry polymerization, solution polymerization, gas phase polymerization or the like in the presence of a Ziegler-Natta catalyst or any other known reduction-type or on-carrier-type high-activity catalyst. MFR of the polymer produced can be varied through any known hydrogenation.

The terminology "pre-activation" referred to herein is meant to indicate pre-activating the catalyst for polyolefin production prior to the main (co)polymerization of propylene alone or propylene and other olefins, to thereby enhance the polymerization activity of the catalyst. For this, for example, ethylene or a combination of ethylene and other olefins is pre-(co)polymerized in the presence of the catalyst for polyolefin production so that the catalyst could carry the ethylene (co)polymer thereon.

The pre-activated catalyst for use in the invention comprises a catalyst for polyolefin production, which is a combination of [AL1] a transition metal compound component at least including a titanium compound, and from 0.01 to 1,000 mols, relative to one mol of the transition metal atom, of an organometal compound with a metal selected from a group of metals belonging to the Group 1, Group 2, Group 12 and Group 13 of the Periodic Table (edition in 1991), and [Ed1] from 0 to 500 mols (preferably from 0 to 100 mols), relative to one mol of the transition metal atom, of an electron donor, and contains polypropylene (a-P) and polyethylene (a-E) held on the carrier, in which the polypropylene (a-P) has the same composition as that of the polypropylene to be formed in main (co)polymerization herein, and has an intrinsic viscosity [$\eta$] of smaller than 15 dl/g, and its amount held on the catalyst falls between 0.01 and 100 g per gram of the transition metal compound component held on the catalyst, and the polyethylene (a-E) has an intrinsic viscosity [$\eta$] of from 15 to 100 dl/g and its amount held on the catalyst falls between 0.01 and 5,000 g per gram of the transition metal compound component held on the catalyst.

For the transition metal compound component to be in the pre-activated catalyst, usable is any known catalyst component heretofore proposed for polyolefin production, which consists essentially of a transition metal compound of catalytic activity and includes at least a titanium compound. Especially preferred for it is a titanium-containing solid catalyst component having the advantage of industrial-scale production.

For such a titanium-containing solid catalyst component, some have been proposed, including, for example, a titanium-containing solid catalyst component comprising, as the essential ingredient, a titanium trichloride composition (Japanese Patent Publication Nos. 3356/1981, 28573/1984, 66323/1988, etc.); and a titanium-containing catalyst component held on a carrier, which comprises, as the essential ingredients, titanium, magnesium, halogen and electron donor, and in which titanium tetrachloride is held on a magnesium compound (Japanese Patent Laid-Open Nos. 104810/1987, 104811/1987, 104812/1987, 63310/1982, 63311/1982, 83006/1983, 138712/1983, etc.). Any of these is employable in the invention.

For the organometal compound [AL1], a compound having an organic group with a metal selected from a group of metals belonging to Group 1, Group 2, Group 12 and Group 13 of the Periodic Table (edition in 1991), for example, an organolithium compound, an organosodium compound, an organomagnesium compound, an organozinc compound, an organoaluminium compound or the like may be combined with the transition metal compound component mentioned above.

Especially preferred is an organoaluminium compound represented by a general formula, $AlR1_pR2_qX_{3-(p+q)}$, wherein R1 and R2 each independently indicate a hydrocarbon group such as an alkyl group, a cycloalkyl group, an aryl group or the like, or an alkoxy group; X indicates a halogen atom; and p and q each indicate an integer with $0<p+q\leq3$.

Specific examples of such an organoaluminium compound are trialkylaluminiums such as trimethylaluminium, triethylaluminium, tri-n-propylaluminium, tri-n-butylaluminium, tri-i-butylaluminium, tri-n-hexylaluminium, tri-i-hexylaluminium, tri-n-octylaluminium, etc.; dialkylaluminium monohalides such as diethylaluminium chloride, di-n-propylaluminium chloride, di-i-butylaluminium chloride, diethylaluminium bromide, diethylaluminium iodide, etc.; dialkylaluminium hydrides such as diethylaluminium hydride, etc.; alkylaluminium sesquihalides such as ethylaluminium sesquichloride, etc.; monoalkylaluminium dihalides such as ethylaluminium dichloride, etc., as well as alkoxyalkylaluminiums such as diethoxymonoethylaluminium, etc. Preferred for use herein are trialkylaluminiums and dialkylaluminium monohalides. Not only one but also two or more of these organoaluminium compounds may be used herein either singly or as combined.

The electron donor [Ed1] is optionally added to the catalyst system for controlling the polyolefin production rate and/or the stereospecificity of the polymer produced. The electron donor [Ed1] may be an organic compound having any of oxygen, nitrogen, sulfur and phosphorus atoms in the molecule or an organosilicon compound having Si—O—C bond(s) in the molecule, including, for example, ethers, alcohols, esters, aldehydes, fatty acids, ketones, nitriles, amines, amides, urea and urea derivatives, isocyanates, azo compounds, phosphines, phosphites, phosphinites, hydrogen sulfide and thioethers, neoalcohols, silanols, etc.

The ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, tetrahydrofuran, etc.; the alcohols include methanol, ethanol, propanol, butanol, pentanol, hexanol, octanol, 2-ethylhexanol, allyl alcohol, benzyl alcohol, ethylene glycol, glycerin, etc.; the phenols include phenol, cresol, xylenol, ethylphenol, naphthol, etc.

The esters include monocarboxylates such as methyl methacrylate, methyl formate, methyl acetate, methyl butyrate, ethyl acetate, vinyl acetate, n-propyl acetate, i-propyl acetate, butyl formate, amyl acetate, n-butyl acetate, octyl acetate, phenyl acetate, ethyl propionate, methyl benzoate, ethyl benzoate, propyl benzoate, butyl benzoate, octyl benzoate, 2-ethylhexyl benzoate, methyl toluate, ethyl toluate, methyl anisate, ethyl anisate, propyl anisate, phenyl anisate, ethyl cinnamate, methyl naphthoate, ethyl naphthoate, propyl naphthoate, butyl naphthoate, 2-ethylhexyl naphthoate, ethyl phenylacetate, etc.; aliphatic polycarboxylates such as diethyl succinate, diethyl methylmalonate, diethyl butylmalonate, dibutyl maleate, diethyl butylmaleate, etc.; esters of aromatic polycarboxylic acids such as monomethyl phthalate, dimethyl phthalate, diethyl phthalate, di-n-propyl phthalate, mono-n-butyl phthalate, di-n-butyl phthalate, di-i-butyl phthalate, di-n-heptyl phthalate, di-2-ethylhexyl phthalate, di-n-octyl phthalate, diethyl i-phthalate, dipropyl i-phthalate, dibutyl i-phthalate, di-2-ethylhexyl i-phthalate, diethyl terephthalate, dipropyl terephthalate, dibutyl terephthalate, di-i-butyl naphthalenedicarboxylate, etc.

The aldehydes includes acetaldehyde, propionaldehyde, benzaldehyde, etc.; the carboxylic acids include monocarboxylic acids such as formic acid, acetic acid, propionic acid, butyric acid, oxalic acid, succinic acid, acrylic acid, maleic acid, valeric acid, benzoic acid, etc.; acid anhydrides such as benzoic anhydride, phthalic anhydride, tetrahydrophthalic anhydride, etc.; the ketones include acetone, methyl ethyl ketone, methyl i-butyl ketone, benzophenone, etc.

The nitrogen-containing compounds include nitriles such as acetonitrile, benzonitrile, etc.; amines such as methylamine, diethylamine, tributylamine, triethanolamine, β-(N,N-dimethylamino)ethanol, pyridine, quinoline, β-picoline, 2,4,6-trimethylpyridine, 2,2,5,6-tetramethylpiperidine, 2,2,5,5-tetramethylpyrrolidine, N,N,N',N'-tetramethylethylenediamine, aniline, dimethylaniline, etc.; amides such as formamide, hexamethylphosphortriamide, N,N,N',N',N"-pentamethyl-N'-β-dimethylaminomethylphosphortriamide, octamethylpyrophosphoramide, etc.; ureas such as N,N,N',N'-tetramethylurea, etc.; isocyanates such as phenyl isocyanate, toluyl isocyanate, etc.; azo compounds such as azobenzene, etc.

The phosphorus-containing compounds include phosphines such as ethylphosphine, di-N-octylphosphine triethylphosphine, tri-n-octylphosphine, triphenylphosphine, triphenylphosphine oxide, etc.; phosphites such as dimethyl phosphite, di-n-octyl phosphite, triethyl phosphite, tri-n-butyl phosphite, triphenyl phosphite, etc.

The sulfur-containing compounds include thioethers such as diethyl thioether, diphenyl thioether, methyl phenyl thioether, etc.; thioalcohols such as ethyl thioalcohol, n-propyl thioalcohol, thiophenol, etc.; and the organosilicon compounds include silanols such as trimethylsilanol, triethylsilanol, triphenylsilanol, etc.; organosilicon compounds having Si—O—C bond(s) in the molecule such as trimethylmethoxysilane, dimethyldimethoxysilane, methylphenyldimethoxysilane, diphenyldimethoxysilane, methyltrimethoxysilane, vinyltrimethoxysilane, phenyltrimethoxysilane, trimethylethoxysilane, dimethyldiethoxysilane, di-i-propyldimethoxysilane, di-i-butyldimethoxysilane, diphenyldiethoxysilane, methyltriethoxysilane, ethyltriethoxysilane, vinyltriethoxysilane, butyltriethoxysilane, phenyltriethoxysilane, ethyltriisopropoxysilane, vinyltriacetoxysilane, cyclopentylmethyldimethoxysilane, cyclopentyltrimethoxysilane, dicyclopentyldimethoxysilane, cyclohexylmethyldimethoxysilane, cyclohexyltrimethoxysilane, dicyclohexyldimethoxysilane, 2-norbornylmethyldimethoxysilane, etc. One or more of these electron donors may be used herein either singly or as combined.

The pre-activated catalyst for use in the invention is prepared by pre-activating a catalyst for polyolefin production which comprises a combination of the above-mentioned transition metal compound component at least including a titanium compound with an organometal compound [AL1]

and an optional electron donor [Ed1]. Precisely, from 0.01 to 500 g of propylene alone or a mixture of propylene and other olefins, of which the composition is the same as that for essential (co)polymerization herein, is fed into a reactor and pre-(co)polymerized in the presence of the polyolefin production catalyst as above, of which the amount falls between 0.001 and 5,000 mmols, preferably between 0.01 and 1,000 mmols in terms of the transition metal element in the catalyst component, per liter of the (co)polymerization capacity, in the absence of a solvent-or in up to 100 liters, relative to one gram of the transition metal compound component of the catalyst, of a solvent to thereby form from 0.01 to 100 g, relative to one gram of the transition metal component compound, of a polypropylene (a-P), and thereafter from 0.01 g to 10,000 g of ethylene alone or a mixture of ethylene and other olefins is fed into the reactor and pre-(co) polymerized for pre-activation of the catalyst to thereby form from 0.01 to 5,000 g, relative to one gram of the transition metal compound component, of a polyethylene (a-E) Through the process, the polypropylene (a-P) and the polyethylene (a-E) are thereby held on the transition metal compound component of the catalyst to thereby pre-activate the catalyst.

The term "polymerization capacity" referred to herein is meant to indicate the volume of the liquid phase in the polymerization reactor for liquid phase polymerization, or the volume of the gas phase therein for gas phase polymerization.

The amount of the transition metal compound component of the catalyst for use herein preferably falls within the range defined above for ensuring efficient and well-controlled (co)polymerization rate for propylene. If the amount of the organometal compound [AL1] used for (co)polymerization is too small, it is unfavorable since the (co)polymerization rate will be too low; but if too large, it is also unfavorable since the increase in the (co)polymerization rate corresponding to the increase in the amount of the organometal compound [AL1] could no more be expected and, in addition, a large amount of the residue of the organometal compound [AL1] will remain in the polypropylene composition finally obtained herein. On the other hand, if the amount of the electron donor [Ed1] used is too large, the (co) polymerization rate will be lowered. If the amount of the solvent used is too large, a large size reactor will be needed and, in addition, the (co)polymerization rate will be difficult to efficiently control and maintain.

In the pre-activated catalyst, the polyethylene (a-E) is an ethylene homopolymer or a copolymer of ethylene and a C3–12 olefin having an ethylene polymer unit content of at least 50% by weight, preferably at least 70% by weight, more preferably at least 90% by weight, of which the intrinsic viscosity [$\eta$] falls between 15 and 100 dl/g, preferably between 17 and 50 dl/g. This finally constitutes a part of the polyethylene for the component (b) in the polypropylene composition (A). Accordingly, the intrinsic viscosity [$\eta E$] of the polyethylene component (b) shall be equal to the intrinsic viscosity [$\eta 1$] of the polyethylene (a-E), that is, [$\eta E$]=[$\eta 1$].

The amount of the polyethylene (a-E) to be held on the catalyst falls between 0.01 and 5,000 g, preferably between 0.05 and 2,000 g, more preferably between 0.1 and 1,000 g, per gram of the transition metal compound component of the catalyst. If the amount of the polyethylene (a-E) held on the catalyst is smaller than 0.01 g per gram of the transition metal compound component of the catalyst, it is undesirable since the melt tension and the crystallization temperature of the polypropylene composition to be finally obtained herein through main (co)polymerization could not be satisfactorily increased or elevated; but if larger than 5,000 g, it is also undesirable since not only the intended increase or elevation will be unsatisfactory but also the polypropylene composition to be finally obtained herein could not be homogeneous.

On the other hand, the polypropylene (a-P) shall have the same composition as that of the polypropylene component (a) to be prepared herein through main (co)polymerization, having an intrinsic viscosity [$\eta$] of smaller than 15 dl/g. This is to finally constitute a part of the polypropylene component (a) of the polypropylene composition (A) of the invention. The polypropylene (a-P) is to facilitate easy dispersion of the polyethylene (a-E) in the polypropylene composition (A) to be finally obtained herein. To that effect, it is desirable that the intrinsic viscosity [$\eta$] of the polypropylene (a-P) is smaller than the intrinsic viscosity [$\eta 1$] of the polyethylene (a-E), and is larger than the intrinsic viscosity [$\eta$] of the polypropylene composition (A) to be finally obtained herein.

It is desirable that the amount of the polypropylene (a-P) to be held on the catalyst falls between 0.01 and 100 g per gram of the transition metal compound component of the catalyst, or, in other words, falls between 0.001 and 1% by weight based on the polypropylene composition (A) to be finally obtained herein. If the amount of the polypropylene (a-P) held on the catalyst is too small, the polyethylene (a-E) will poorly disperse in the intended polypropylene composition (A); but if too large, not only the capability of the polyethylene (a-E) to increase the melt viscosity of the polypropylene composition (A) will be saturated but also the production efficiency in preparing the pre-activated catalyst will be lowered.

The pre-activation of the catalyst for use herein may be effected in a liquid phase containing a solvent selected from aliphatic hydrocarbons such as butane, pentane, hexane, heptane, octane, isooctane, decane, dodecane, etc.; alicyclic hydrocarbons such as cyclopentane, cyclohexane, methylcyclohexane, etc.; aromatic hydrocarbons such as toluene, xylene, ethylbenzene, etc.; other inert solvents such as gasoline fractions, hydrogenated diesel oil fractions, etc.; or in a liquid phase where the olefins to be (co)polymerized serve as a solvent for them; or may also be effected in a gas phase not containing a solvent.

The pre-activation may be effected in the presence of hydrogen, but is preferably effected in the absence of hydrogen in order to form a high-molecular-weight polyethylene (a-E) having an intrinsic viscosity [$\eta$] of from 15 to 100 dl/g.

In the pre-activation process, the condition for pre-polymerizing propylene or a mixture of propylene and other olefins of which the composition shall be the same as that for main (co)polymerization herein, shall be such that the propylene or its mixture with other olefins could give from 0.01 g to 100 g, per gram of the transition metal compound component of the catalyst, of a polypropylene after having been pre-(co)polymerized under the condition. In general, propylene or its mixture with other olefins is pre-(co) polymerized at a temperature falling between −40° C. and 100° C. under a pressure falling between 0.1 MPa and 5 MPa for a period of time falling between 1 minute and 24 hours. The condition for pre-(co)polymerizing ethylene or a mixture of ethylene and other olefins to pre-activate the catalyst is not specifically defined so far as ethylene or its mixture with other olefins could give from 0.01 g to 5,000 g, preferably from 0.05 to 2,000 g, more preferably from 0.1 to 1,000 g, per gram of the transition metal compound component of the catalyst, of a polyethylene (a-E) after having been pre-(co)polymerized under a predetermined condition. In general, ethylene or its mixture with other olefins is pre-(co)polymerized at a relatively low temperature falling between −40° C. and 40° C., preferably between −40° C. and 30° C., more preferably between −40° C. and 20° C. or so, under a pressure falling between 0.1 MPa and 5 MPa, preferably between 0.2 MPa and 5 MPa, more preferably between 0.3 MPa and 5 MPa, for a period of time falling between 1 minute and 24 hours, preferably between 5 minutes and 18 hours, more preferably between 10 minutes and 12 hours.

After having been pre-activated in the manner as above, the catalyst may be subjected to an additional step of addition polymerization with propylene or a mixture of propylene and other olefins of which the composition shall be the same as that for main (co)polymerization herein. This is for preventing the (co)polymerization activity of the pre-activated catalyst from being lowered. Through the additional step of addition polymerization, from 0.01 to 100 g, per gram of the transition metal compound component of the catalyst, of an additional polypropylene could be formed. In this case, the type and the amount of the organometal compound [AL1], the electron donor [Ed1] and the solvent to be used may be the same as those for the pre-(co)polymerization of ethylene or a mixture of ethylene and other olefins for catalyst pre-activation. Preferably, however, the additional step of addition polymerization is effected in the presence of from 0.005 to 10 mols, more preferably from 0.01 to 5 mols, per mol of the transition metal element of the catalyst component, of an electron donor [Ed1]. For its reaction condition, the temperature may fall between −40 and 100° C., the pressure may fall between 0.1 and 5 MPa, and the reaction time may fall between 1 minute and 24 hours.

The intrinsic viscosity [η] of the polypropylene to be formed through addition polymerization shall be smaller than the intrinsic viscosity [η1] of the polyethylene (a-E), and the polypropylene is to be finally a part of the polypropylene component (a) after the main (co)polymerization.

The pre-activated catalyst is directly, or after having been combined with an additional organometal compound [AL2] and an additional electron donor [Ed2], used for main olefin (co)polymerization of C2–12 olefins to give the intended polypropylene composition (A).

The catalyst for main olefin (co)polymerization in the invention may be the above-mentioned pre-activated catalyst alone, or a combination of the pre-activated catalyst with additional organometal compound [AL2] and electron donor [Ed2] in which the total of the organometal compounds [AL1] and [AL2], [AL1+AL2] falls between 0.05 and 3,000 mols, preferably between 0.1 and 1,000 mols, relative to one mol of the transition metal atom in the pre-activated catalyst, and the total of the electron donors [Ed1] and [Ed2], [Ed1+Ed2] falls between 0 and 5,000 mols, preferably between 0 and 3,000 mols, relative to one mol of the transition metal atom in the pre-activated catalyst.

If the t total of the organometal compounds [AL1+AL2] is too small, it is unfavorable since the (co)polymerization rate in the main (co)polymerization of propylene or its mixture with other olefins will be too low; but even if too large, the (co)polymerization rate there in could not be increased to an expected degree and no efficient process is expected, and adding such excess [AL1] and [AL2] to the catalyst is also unfavorable since the amount of the organometal compounds that may remain in the finally-obtained polypropylene composition will increase. If the electron donor content [Ed1+Ed2] increases too much, the (co)polymerization rate will be greatly lowered.

Regarding their type, the additional organometal compound [AL2] and electron donor [Ed2] that may be optionally added to the catalyst for the main olefin (co)polymerization may be the same as those of the organometal compound [AL1] and the electron donor [Ed1] already mentioned hereinabove. One or more different compounds may be used either singly or as combined for the additional organometal compound [AL2] and electron donor [Ed2]. These may be just the same as or different from those used in pre-activation of the catalyst.

The solvent, the non-reacted olefins, and the excess organometal compound [AL1] and electron donor [Ed1] may be removed through filtration or decantation from the pre-activated catalyst, and the resulting granular powder may be used as the catalyst for the main olefin (co)polymerization. If desired, a solvent may be added to the granular powder to form a suspension for the catalyst, or the suspension may be combined with additional organometal compound [AL2] and optionally electron donor [Ed2] for the catalyst. As the case may be, the solvent and the non-reacted olefins in the pre-activated catalyst may be evaporated away through distillation under reduced pressure, or along with inert gas streams introduced thereinto, and the resulting granular powder may be used as the catalyst. If desired, a solvent may be added to the granular powder to form a suspension for the catalyst, or, if further desired, the suspension may be combined with additional organometal compound [AL2] and electron donor [Ed2] for the catalyst.

In the process for preparing the polypropylene composition (A) described in claim 2 of the invention, the amount of the pre-activated catalyst or the catalyst for the main olefin (co)polymerization to be used falls between 0.001 and 1,000 mmols, preferably between 0.005 and 500 mmols, in terms of the transition metal atom in the pre-activated catalyst, per liter of the polymerization capacity. With the transition metal compound component of the catalyst being defined for its amount to fall within the range as above, an efficiently controlled (co)polymerization rate for propylene or its mixture with other olefins could be ensured.

For the main (co)polymerization of propylene or its mixture with other olefins in the invention, employable is any per-se known olefin (co)polymerization process. Concretely, employable for it is any process of slurry polymerization for olefin (co)polymerization to be effected in an inert solvent selected from, for example, aliphatic hydrocarbons such as propane, butane, pentane, hexane, heptane, octane, isooctane, decane, dodecane or the like, alicyclic hydrocarbons such as cyclopentane, cyclohexane, methylcyclohexane or the like, aromatic hydrocarbons such as toluene, xylene, ethylbenzene or the like, and other inert solvents such as gasoline fractions, hydrogenated diesel oil fractions or the like; bulk polymerization in which the olefins to be (co)polymerized act also as a solvent; gas phase polymerization in which olefins are (co)polymerized in a gas phase; or liquid phase polymerization in which the (co)polymerized polyolefin is in liquid. Two or more of these polymerization process may be combined, if desired.

In any polymerization process as above, the condition for polymerization may be as follows: The polymerization temperature falls between 20 and 120° C., preferably between 30 and 100° C., more preferably between 40 and 100° C.; the polymerization pressure falls between 0.1 and 5 MPa, preferably between 0.3 and 5 MPa; and the polymerization time falls between 5 minutes and 24 hours or so; and the monomers are (co)polymerized continuously, semi-continuously or batchwise in that condition. Under the condition as above, the monomers are efficiently (co) polymerized at an well controlled reaction rate to give the polypropylene component (a-P) to be the component (a).

In a more preferred embodiment of the method of producing the polypropylene composition (A) of the invention, the polymerization condition is so controlled that the polypropylene composition to be formed through main (co)polymerization and the polypropylene composition to be finally obtained both have MFR [at 230° C. under 21.18 N] falling between 0.1 and 50 g/10 min, preferably between 0.3 and 30 g/10 min, more preferably between 0.3 and 20 g/10 min, and that the polypropylene composition (A) thus obtained contains from 0.01 to 5% by weight, preferably from 0.1 to 2% by weight, more preferably from 0.2 to 1% by weight of the polyethylene (a-E) derived from the pre-activated catalyst used therein. Like in known olefin polymerization, MFR of the (co)polymers produced can be controlled by introducing hydrogen into the polymerization system.

After the main (co)polymerization, if desired, the system may be post-treated in any known manner for catalyst deactivation, catalyst residue removal and drying the (co) polymer product, whereby is finally obtained the intended polypropylene composition (A) having a high melt tension and a high crystallization temperature.

In the method for producing the polypropylene composition (A) described in claim 2 of the invention, a high-molecular-weight polyethylene (a-E) is formed in the step of catalyst pre-activation, and this is uniformly dispersed in the final polypropylene composition (A). In this, therefore, it is possible to prepare the necessary amount of the pre-activated catalyst all at a time, and, in the subsequent main (co)polymerization step of (co)polymerizing propylene or its mixture with other olefins, the monomers can be (co) polymerized in any known process of ordinary olefin (co) polymerization. Accordingly, in the method, the productivity of the final polyolefin composition (A) to be produced is comparable to that in ordinary polyolefin production.

Using the pre-activated catalyst in the process of producing the polypropylene composition (A) facilitates the production of the intended crystalline polypropylene composition (A) that satisfies the requirements of the defined melt tension (MS) at 230° C., MFR [at 230° C. under 21.18N], density and melting point thereof.

The non-halogen flame retardant to be in the flame-retardant polyolefin composition of the invention includes, for example, hydrated metal compounds such as aluminium hydroxide, magnesium hydroxide, calcium aluminate, etc.; inorganic phosphorus compounds such as red phosphorus, ammonium polyphosphate, etc.; organic phosphate compounds such as triphenyl phosphate, tricresyl phosphate, bisphenol A-bisdiphenyl phosphate, resorcinol-bisdiphenyl phosphate, etc.; nitrogen-containing organic compound such as 1,3,5-triazine derivatives, melamine derivatives, guanamine derivatives, guanidine derivatives, etc.

One or more of these flame retardants may be in the composition either singly or as combined. If desired, the flame retardant may be combined with any flame retardation promoter of, for example, expandable graphite, polyamides, metal oxides, polyalcohols, etc.

Of the compounds mentioned above, preferred for the flame retardant for use in the invention are an ammonium polyphosphate, a combination of an ammonium polyphosphate and a 1,3,5-triazine compound, a combination of an ammonium polyphosphate and a polyamide, a combination of an ammonium polyphosphate and expandable graphite, a combination of an ammonium polyphosphate, a nitrogen-containing organic compound and a metal oxide.

The ammonium polyphosphate for use herein is preferably a non-processed ammonium polyphosphate, a melamine-modified ammonium polyphosphate, and a coated ammonium polyphosphate.

These ammonium polyphosphates are available on the market. The commercial products of the compounds are, for example, Sumisafe P (trade name, from Sumitomo Chemical Company Limited), Sumisafe PM (trade name, from Sumitomo Chemical Company Limited), Phoscheck P/30 (trade name, from Monsant), Pho'scheck P/40 (trade name, from Monsant), Terraju C60 (trade mark, from Chisso Corporation), Terraju C70 (trade mark, from Chisso Corporation).

In the flame-retardant polyolefin composition of the invention, the blend ratio of such an ammonium polyphosphate may fall between 12 and 25% by weight of the composition. If the blend ratio of the compound in the composition is smaller than 12% by weight, the flame retardancy of the composition could not be in the rank V-0 in the UL94 combustion test (for 1/32 inch-thick pieces); but even if larger than 25% by weight, the effect of the compound to improve the flame retardancy of the composition could not be enhanced any more. In addition, adding such an excessive ammonium polyphosphate to the composition is unfavorable as it will enlarge the moisture absorption of the composition.

As comprising the above-mentioned, high-melt-tension, high-crystallization-point polypropylene composition (A) as the base resin, the flame-retardant polyolefin composition of the invention enjoys flame retardancy of rank V-0 in the UL burning test (for 1/32 inch-thick pieces) even when the amount of the flame retardant therein is only 60% by weight or less thereof to be added to ordinary polyolefin resin.

One preferred embodiment of nitrogen-containing organic compounds for use herein is 1,3,5-triazine derivatives of the following general formula (1):

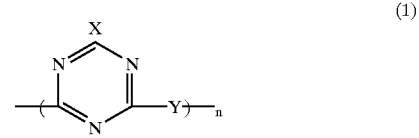

wherein X indicates a morpholino group or a piperidino group; Y indicates a divalent residue of piperazine; and n indicates an integer falling between 2 and 50.

Combining the 1,3,5-triazine derivative with ammonium polyphosphate in the composition ensures far better flame retardancy of the composition containing them.

Specific examples of the 1,3,5-triazine derivative are 2-piperadinylene-4-morpholino-1,3,5-triazine oligomers or polymers, and 2-piperadinylene-4-piperidino-1,3,5-triazine oligomers or polymers. The blend ratio of the 1,3,5-triazine derivative in the flame-retardant composition falls between 5 and 10% by weight of the composition. If the blend ratio of the derivative in the composition is smaller than 5% by weight, the flame retardancy of the composition could not be in the rank V-0 in the UL94 burning test (for 1/32 inch-thick pieces); but even if larger than 10% by weight, the effect of the derivative to improve the flame retardancy of the composition could not be enhanced any more.

The above-mentioned 2-piperadinylene-4-morpholino-1,3,5-triazine oligomers or polymers which are of one type of the 1,3,5-triazine derivative can be obtained, for example, as follows: A 2,6-dihalo-4-morpholino-1,3,5-triazine (e.g., 2,6-dichloro-4-morpholino-1,3,5-triazine) and piperazine in an equivalent molar ratio are reacted under heat in the presence of an organic or inorganic base (e.g., triethylamine, tributylamine, sodium hydroxide, potassium hydroxide, sodium carbonate, etc.) in an inert solvent such as xylene or the like, preferably at the boiling point of the inert solvent, and, after having been thus reacted, the resulting reaction mixture is filtered to separate and remove salts of by-products, and then washed with boiling water and dried to obtain the intended oligomer or polymer.

2-Piperadinylene-4-piperidino-1,3,5-triazine oligomers or polymers can be obtained, for example, as follows: A 2,6-dihalo-4-piperidino-1,3,5-triazine (e.g., 2,6-dichloro-4-piperidino-1,3,5-triazine or 2,6-dibromo-4-piperidino-1,3,5-triazine) and piperazine in an equivalent molar ratio are reacted under heat in the presence of an organic or inorganic base (e.g., triethylamine, tributylamine, sodium hydroxide, potassium hydroxide, sodium carbonate, etc.) in an inert solvent such as triisopropylbenzene or the like, preferably at the boiling point of the inert solvent, and, after having been thus reacted, the resulting reaction mixture is filtered to separate and remove salts of side products, and then washed with boiling water and dried to obtain the intended oligomer or polymer.

Polyamides serving as a flame retardation promoter usable herein may be any of aliphatic polyamides and aromatic polyamides, concretely including nylon-6, nylon-66, nylon-6,10, nylon-12, nylon AHBA/-6, nylon THDT. These are all available on the market. For ensuring better flame retardancy of the composition of the invention, the amount of the polyamide to be in the composition may be from 1/2 to 3 times the ammonium polyphosphate to be therein.

The flame-retardant polyolefin composition (C) of the invention may further contain, in addition to the above-mentioned flame retardant, various types of ordinary stabilizers and additives for polypropylenes not interfering with the object of the invention.

Concretely, the following compounds may be used for such stabilizers and additives:

Phosphorus-containing antioxidants such as bis(2,6-di-t-butyl-4-methylphenyl)pentaerythritol di-phosphite, di-stearyl-pentaerythritol di-phosphite, bis(2,4-di-t-butylphenyl)pentaerythritol di-phosphite, tris(2,4-di-t-butylphenyl) phosphite, tetrakis(2,4-di-tert-butylphenyl) 4,4'-biphenylenediphosphite, etc.; phenolic antioxidants such as 2,6-di-t-butyl-p-cresol, tetrakis[methylene(3,5-di-t-butyl-4-hydroxyphenylcinnamate)]methane. 1,3,5-trimethyl-2,4,6-tris(3,5-di-t-butyl-4-hydroxybenzyl)benzene, tris(3,5-di-t-butyl-4-hydroxybenzyl) isocyanurate, etc.; thio-type antioxidants such as di-stearyl $\beta,\beta'$-thio-di-propionate, dimyristyl $\beta,\beta'$-thio-di-propionate, di-lauryl $\beta,\beta'$-thio-di-propionate, etc.; neutralizing agents such as calcium stearate, Hydrotalcite (trade name, from Kyowa Chemical Industry), etc.; UV absorbents such as 2-hydroxy-4-n-octoxybenzophenone, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc.; light-resisting agents such as n-hexadecyl 3,5-di-t-butyl-4-hydroxybenzoate, 2,4-di-t-butylphenyl 3',5'-di-t-butyl-4'-hydroxybenzoate, bis(2,2,6,6-tetramethyl-4-piperidyl) sebacate, dimethylsuccinate/2-(4-hydroxy-2,2,6,6-tetramethyl-1-piperidyl)ethanol condensate. condensate, poly{[6-[(1,1,3,3-tetramethylbutyl)amino]-1,3,5-triazine-2,4-diyl]-[(2,2,6,6-tetramethyl-4-piperidyl)imino] hexamethylene-[(2,2,6,6-tetramethyl-4-piperidyl)imine]}, N,N'-bis(3-aminopropyl)ethylenediamine-2,4-bis[N-butyl-N-(1,2,2,6,6-pentamethyl-4-piperidyl)amino]-6-chloro-1,3,5-triazine condensate, etc.; metal inactivators such as copper injure inhibitors, etc.; antistatic agents; colorants and their dispersants such as waxes, metal salts of fatty acids, etc.; nucleating agents; ordinary polypropylenes (random copolymers and block copolymers); polyethylenes; olefinic elastomers, etc.

The flame-retardant polyolefin composition of the invention is obtained by blending the above-mentioned components. For blending them, for example, usable are any ordinary mixing devices, for example, high-speed stirrer-equipped mixers such as Henschel® mixers, super mixers, etc.; as well as ribbon blenders, tumblers, etc. In case where the components need kneading in melt, they will be melt-kneaded in ordinary single-screw or twin-screw extruders or the like, then extruded out, and pelletized. For these, the kneading temperature generally falls between 170 and 220° C.

In molding the flame-retardant polyolefin composition of the invention into moldings, it is important that the molding temperature is appropriately selected in consideration of the decomposition temperature of the flame retardant therein so as not to detract from the flame retardancy of the resulting moldings. In general, injection molding machines or extruders for the composition will be set at temperatures falling between 170 and 220° C. In case where the flame-retardant polyolefin composition of the invention is molded in an injection molding process, its MFR (at 230° C. under 21.18 N) preferably falls between 3 and 50 g/10 min, more preferably between 5 and 20 g/10 min, even more preferably between 8 and 15 g/10 min. In case where the composition is molded in an extrusion process into blow molded articles and sheets, its MFR (at 230° C. under 21.18 N) preferably falls between 0.1 and 4 g/10 min, more preferably between 0.3 and 3 g/10 min.

EXAMPLES

The invention is described more concretely with reference to the following Examples and Comparative Examples, which, however, are not intended to restrict the scope of the invention. In the following Examples and Comparative Examples, the samples prepared are tested and evaluated for their characteristics according to the methods mentioned below.

(1) Crystal Melting Point (Abbreviation, Tm)

In a differential scanning calorimeter (abbreviation, DSC), 10 mg of a sample to be tested is heated in a nitrogen atmosphere at a heating rate of 20° C./min from room temperature (23° C.). With its crystal being melted, the data obtained are plotted to give an endothermic curve, in which the peak temperature indicates Tm (unit, °C) of the sample.

(2) Density

This is measured according to the density ingredient tube method (test condition D) of JIS K7112 (1980) (unit, g/cm$^3$)

(3) MFR

This is measured under the test condition 14 (at 210° C. under 21.18 N) of JIS K7201 (unit, g/10 min).

(4) Intrinsic Viscosity [η]

A sample to be tested is put into a solvent, tetralin at 135° C. and its inherent viscosity is measured with an automatic viscometer, Mitsui Toatsu's Model AVS2 (unit, dl/g).

(5) Flame Retardancy

A sample of 127×12.7×0.8 mm in size prepared through injection molding is tested according to the vertical burning test of the United States UL Standards, UL94, for flame retardancy (rank).

(6) Cotton Ignition (Flaming Drip Resistance)

A sample to be tested is burned according to the vertical burning test of UL94, and its melt having dripped onto a piece of cotton wool just below the sample is observed as to whether or not it ignites the cotton wool piece. For this, five samples are tested in the same manner, and the number of the samples of which the burned melt drops have ignited the cotton wool piece is counted.

(7) Stiffness

A sample is tested for the flexural modulus according to the test method of JIS K7203. The sample piece has a size of 100×10×4 mm, and the bending rate is 1.5 mm/min.

(8) Izod Impact Strength

This is measured according to JIS K6758.

(9) Moldability (for Blow Molding)

At a molding temperature of 210° C., a sample to be tested is molded in a mode of extrusion blow-molding, for which the parison has a uniform wall thickness, a length of 700 mm, and a weight of 1200 g. The blow-molded article from the parison has a weight of 580 g. In this molding process, the drawdown resistance of the parison sample is checked. (OO: With little drawdown, he samples were molded into good articles. O: With a little but negligible drawdown, the samples were molded into practicable articles. Δ: Though moldable, the samples had much drawdown while being molded, and the wall thickness of their moldings fluctuated. X: Owing to great drawdown, the samples could not be molded.)

(10) Melt Tension

A polypropylene composition sample to be tested is put into a melt tensiometer, Toyo Seiki Seisakusho's Melt Tension Tester Model 2, and heated at 230° C. therein. The resulting melt of the polypropylene composition sample is extruded out through a nozzle having a diameter of 2.095 mm at a rate of 20 mm/min into air at 23° C. to be a strand, with the strand being taken up at a rate of 4.71 m/min. While being thus taken up, the tension of the strand of the polypropylene composition sample is measured (unit, cN), and this indicates the melt tension (MS) of the sample.

(11) Molecular Weight Distribution

Using GPC (Model 150C from Waters), the weight-average molecular weight (Mw) and the number-average molecular weight of each sample are measured. The ratio Mw/Mn indicates the molecular weight distribution of the sample.

The details of the polypropylene resin composition and the flame retardant used in the following Examples and Comparative Examples are described below along with their abbreviations.

[Polypropylene Composition (A)]

A-1: Polypropylene composition comprising propylene homopolymer with 0.29 parts by weight, relative to 100 parts by weight of the propylene homopolymer, of polyethylene (intrinsic viscosity [ηE], 36 dl/g), and having MFR of 8.9 g/10 min, a crystal melting point (Tm) of 165° C., a molecular weight distribution (Mw/Mn) of 4.6, a density of 0.901 g/cm³, and a melt tension of 3.1 cN.

A-2: Polypropylene composition comprising propylene-ethylene block copolymer (propylene polymer unit content, 88% by weight) with 0.88 parts by weight, relative to 100 parts by weight of the propylene copolymer, of polyethylene (intrinsic viscosity [ηE], 43 dl/g), and having MFR of 7.5 g/10 min, a crystal melting point (Tm) of 163° C., a molecular weight distribution (Mw/Mn) of 8.2, a density of 0.901 g/cm³, and a melt tension of 4.3 cN.

A-3: Polypropylene composition comprising propylene-ethylene block copolymer (propylene polymer unit content, 84% by weight) with 0.70 parts by weight, relative to 100 parts by weight of the propylene copolymer, of polyethylene (intrinsic viscosity [ηE], 31 dl/g), and having MFR of 31.5 g/10 min, a crystal melting point (Tm) of 163° C., a molecular weight distribution (Mw/Mn) of 8.6, a density of 0.901 g/cm³, and a melt tension of 1.9 cN.

A-4: Polypropylene composition comprising propylene-ethylene block copolymer (propylene polymer unit content, 87% by weight) with 0.19 parts by weight, relative to 100 parts by weight of the propylene copolymer, of polyethylene (intrinsic viscosity [ηE], 10.5 dl/g), and having MFR of 12.4 g/10 min, a crystal melting point (Tm) of 163° C., a molecular weight distribution (Mw/Mn) of 6.6, a density of 0.901 g/cm³, and a melt tension of 0.6 cN.

A-5: Propylene-ethylene block copolymer having MFR of 8.7 g/10 min, a crystal melting point (Tm) of 163° C., a molecular weight distribution (Mw/Mn) of 5.7, a density of 0.902 g/cm³, a melt tension of 0.5 cN, and a propylene polymer unit content of 88% by weight.

A-6: Polypropylene composition comprising propylene-ethylene block copolymer (propylene polymer unit content, 84% by weight) with 0.72 parts by weight, relative to 100 parts by weight of the propylene copolymer, of polyethylene (intrinsic viscosity [ηE], 41 dl/g), and having MFR of 1.6 g/10 min, a crystal melting point (Tm) of 162° C., a molecular weight distribution (Mw/Mn) of 8.6, a density of 0.901 g/cm³, and a melt tension of 7.3 cN.

A-7: Polypropylene composition comprising propylene-ethylene block copolymer (propylene polymer unit content, 88% by weight) with 0.29 parts by weight, relative to 100 parts by weight of the propylene copolymer, of polyethylene (intrinsic viscosity [ηE], 34 dl/g), and having MFR of 0.61 g/10 min, a crystal melting point (Tm) of 162° C., a molecular weight distribution (Mw/Mn) of 7.6, a density of 0.901 g/cm³, and a melt tension of 17.2 cN.

A-8: Propylene-ethylene block copolymer having MFR of 0.96 g/10 min, a crystal melting point (Tm) of 164° C., a molecular weight distribution (Mw/Mn) of 6.6, a density of 0.901 g/cm³, a melt tension of 2.3 cN, and a propylene polymer unit content of 87% by weight.

[Flame Retardant (B)]

B-1: Ammonium Polyphosphate.

B-2: 2-Piperadinylene-4-morpholino-1,3,5-triazine polymer (of formula (1) where n=11).

B-3: 2-Piperadinylene-4-piperidino-1,3,5-triazine polymer (of formula (1) where n=11).

Examples 1 to 4, Comparative Examples 1 to 5

As in Table 1 below, a base resin, ammonium polyphosphate and a 1,3,5-triazine derivative in the ratio indicated therein were put into a Henschel® mixer, along with 0.15% by weight, relative to the resulting composition, of 2,6-di-t-butyl-p-cresol and 0.2% by weight of di-myristyl β,β-thiodipropionate both serving as an antioxidant, and 0.1% by weight of hydrotalcite serving as a neutralizing agent, and uniformly mixed by stirring them for 3 minutes. In an extruder set at 210° C., the resulting mixture was kneaded in melt, and extruded out, and the thus-extruded strands were cooled and cut into pellets. The resulting pellets were molded into predetermined test pieces, and these were tested for flexural modulus, self-extinguish time, cotton ignition and UL 94 flame retardancy. The test results are given in Table 1.

Examples 5 to 8, Comparative Examples 6, 7

As in Table 2 below, a base resin, ammonium polyphosphate and a 1,3,5-triazine derivative in the ratio indicated therein were put into a Henschel® mixer, along with 0.15% by weight, relative to the resulting composition, of 2,6-di-t-butyl-p-cresol and 0.2% by weight of di-myristyl β,β-thiodipropionate both serving as an antioxidant, and 0.1% by weight of a hydrotalcite serving as a neutralizing agent, and uniformly mixed by stirring them for 3 minutes. In an extruder set at 210° C., the resulting mixture was kneaded in melt, and extruded out, and the thus-extruded strands were cooled and cut into pellets. The resulting pellets were molded into predetermined test pieces, and these were tested for flexural modulus, self-extinguish time, cotton ignition and UL 94 flame retardancy. The test results are given in Table 1.

UL94 burning test (for 1/32 inch-thick test pieces). On the other hand, in Comparative Examples 1 to 5, the polypropylene resin composition for the base resin is not within the scope of the invention. In the injection-molding compositions of Comparative Examples 1 and 2, the intrinsic viscosity [ηE] of the ethylene polymer used is outside the scope of the invention claimed herein. Therefore, the melt tension of the compositions is small, and the flaming drip resistance of the moldings of the compositions is poor. When the compositions of these Comparative Examples are compared with those containing the same amount of the flame retardant of the Examples of the invention, the cotton ignition resistance of the former is lower than that of the latter. For their flame retardancy, the samples of these Comparative Examples were all in the rank V-2 in the UL94 burning test (for 1/32 inch-thick test pieces).

In Comparative Examples 3 to 5, the base resin, propylene-ethylene block copolymer used is outside the

TABLE 1

| | | | Example | | | | Comparative Example | | | | |
|---|---|---|---|---|---|---|---|---|---|---|---|
| | | | 1 | 2 | 3 | 4 | 1 | 2 | 3 | 4 | 5 |
| Formulation wt. % | Base Resin (A) | A-1 | 71 | | | | | | | | |
| | | A-2 | | 71 | 71 | | | | | | |
| | | A-3 | | | | 71 | | | | | |
| | | A-4 | | | | | 71 | 71 | | | |
| | | A-5 | | | | | | | 71 | 71 | 48 |
| | Flame Retardant (B) | B-1 | 21 | 21 | 21 | 21 | 21 | 21 | 21 | 21 | 35 |
| | | B-2 | 8 | 8 | | 8 | 8 | | 8 | | 17 |
| | | B-3 | | | 8 | | | 8 | | 8 | |
| MFR-<1> of Composition, g/10 min | | | 10.2 | 9.0 | 9.0 | 34 | 13.5 | 13.8 | 9.5 | 9.8 | 7.0 |
| Flexural Modulus MPa | | | 1800 | 1650 | 1620 | 1600 | 1750 | 1720 | 1680 | 1650 | 1800 |
| Izod Impact Strength KJ/m² | | | 3.0 | 4.5 | 4.5 | 3.5 | 4.0 | 4.0 | 4.5 | 4.5 | 2.0 |
| Self-Extinguish Time sec | | | 0 | 0 | 0 | 0 | 3 | 2 | 3 | 4 | 0 |
| Cotton Ignition | | | 0/5 | 0/5 | 0/5 | 0/5 | 3/5 | 3/5 | 5/5 | 5/5 | 0/5 |
| Flame Retardancy (UL94) | | | V-0 | V-0 | V-0 | V-0 | V-2 | V-2 | V-2 | V-2 | V-0 |

TABLE 2

| | | | Example | | | | Comparative Example | |
|---|---|---|---|---|---|---|---|---|
| | | | 5 | 6 | 7 | 8 | 6 | 7 |
| Formulation wt. % | Base Resin (A) | A-6 | 71 | 71 | | | | |
| | | A-7 | | | 71 | 71 | | |
| | | A-8 | | | | | 71 | 71 |
| | Flame Retardant (B) | B-1 | 21 | 21 | 21 | 21 | 21 | 21 |
| | | B-2 | 8 | | 8 | | 8 | |
| | | B-3 | | 8 | | 8 | | 8 |
| MFR-<1> of Composition, g/10 min | | | 2.2 | 2.0 | 0.9 | 0.8 | 1.4 | 1.2 |
| Flexural Modulus MPa | | | 1250 | 1230 | 1270 | 1250 | 1200 | 1180 |
| Self-Extinguish Time sec | | | 0 | 0 | 0 | 0 | 3 | 2 |
| Cotton Ignition | | | 0/5 | 0/5 | 0/5 | 0/5 | 5/5 | 5/5 |
| Flame Retardancy (UL94) | | | V-0 | V-0 | V-0 | V-0 | V-2 | V-2 |
| Moldability (drawdown resistance) | | | ○ | ○ | ○○ | ○○ | Δ | Δ |

The samples in Table 1 are of flame-retardant polyolefin compositions for injection molding.

In Example 1, used is a polypropylene composition (A) containing a propylene homopolymer component (a) of the invention. In this, therefore, the stiffness of the moldings formed is high. In Examples 2 to 4, used is a propylene-ethylene block copolymer component (a) of the invention, and the impact resistance of the moldings formed is high. All the samples in these Examples were soon self-extinguished, and their melt drops did not ignite cotton wool. For their flame retardancy, the samples were all in the rank V-0 in the scope of the invention. In Comparative Examples 3 and 4, the melt tension of the compositions is small, and the flaming drip resistance of the moldings of the compositions is poor. For their flame retardancy, the samples of these Comparative Examples were all in the rank V-2 of UL94. Only the composition of Comparative Example 5 containing an increased amount of the flame retardant had improved cotton ignition resistance, and its flame retardancy rank is V-0. However, the balance of its physical properties is not good, and increasing the expensive flame retardant to be in the composition is uneconomical.

The samples in Table 2 are of flame-retardant polyolefin compositions having MFR suitable for blow extrusion molding.

The compositions of Examples 5 to 8 comprise, as the base resin, a polypropylene polymer (A) of the invention. When burned, their melt drops did not ignite cotton wool, and their flame retardancy is in the rank V-0 in the UL94 burning test (for 1/32 inch-thick test pieces), and is good. In addition, the drawdown resistance (moldability) of the molten parisons of these compositions is good. The blow-molded articles of the compositions have uniform cross sections. On the other hand, in the compositions of Comparative Examples 6 and 7, the base resin is outside the invention claimed herein. Therefore, the drawdown resistance necessary for blow-molded articles of the compositions of these Comparative Examples is poor, and the cross sections of the blow-molded articles of the compositions are not uniform. Therefore, the use of the compositions is greatly limited. Moreover, the flaming drip resistance of the compositions is poor, and the flame retardancy thereof is therefore not good, Industrial Applicability The flame-retardant polyolefin composition of the invention comprises, as the base resin, a specific polypropylene composition (A) having an extremely high melt tension. Therefore, its flaming drip resistance in burning is good. When compared with conventional compositions comprising ordinary polypropylene, the polyolefin composition of the invention has extremely excellent flame retardancy, and the amount of the flame retardant to be added thereto may be small. Therefore, the polyolefin composition of the invention has good mechanical properties intrinsic to ordinary polypropylene. In addition, since its melt tension is high, the polyolefin composition of the invention is favorable to blow-molded articles. Moreover, since it generates neither corrosive gas nor toxic gas while molded or when burned, the polyolefin composition of the invention is favorable to various applications including electric appliances for household use, industrial appliances, etc.

What is claimed is:

1. A flame-retardant polyolefin composition comprising, as the base resin, (A) a polypropylene composition which comprises;
   (a) 100 parts by weight of a propylene homopolymer or a propylene-ethylene block copolymer containing at least 50% by weight of propylene polymer units, and
   (b) from 0.01 parts by weight to a 5 parts by weight of an ethylene homopolymer or an ethylene-olefin copolymer containing at least 50% by weight or ethylene polymer units, which has an intrinsic viscosity (ηE) falling between 15 dl/g and 100 dl/g,
   and which has a melt flow rate (MFR) falling between 0.1 and 50 g/10 min (at 230° C. under 21.18 N), a melting point (Tm) falling between 150 and 167° C., a density falling between 0.895 and 0.910 g/cm³, and a melt tension at 230° C. falling between 1 cN and 20 cN, and (B) a non-halogen containing flame retardant (B) added to the base resin, wherein in said composition, the polypropylene composition (A) comprises;
   (a) 100 parts by weight of a propylene homopolymer or a propylene-olefin copolymer containing at least 50% by weight of propylene polymer units, which is prepared through homo-polymerization of propylene or copolymerization of propylene with an olefin having 2 or from 4 to 12 carbon atoms in the presence of a pre-activated catalyst for polyolefin production which comprises a combination of a transition metal compound component at least including a titanium compound, and from 0.01 to 1,000 mols, relative to one mol of the transition metal atom, of an organometal compound with a metal selected from a group of metals belonging to the Group 1, Group 2, Group 12 and Group 13 of the Periodic Table, and from 0 to 500 mols, relative to one mol of the transition metal atom, of an electron donor, and which contains from 0.01 to 100 g, per gram of the transition metal compound component held on the catalyst, of a polypropylene having an intrinsic viscosity (ηE) of smaller than 15 dl/g, and from 0.01 to 5,000 g, per gram of the transition metal compound component, of a poly-ethylene having an intrinsic viscosity (ηE) of from 15 to 100 dl/g, and
   (b) from 0.01 to 5 parts by weight of an ethylene homopolymer or an ethylene-olefin copolymer that contains at least 50% by weight of ethylene polymer units, and having an intrinsic viscosity (ηE) of from 15 to 100 dl/g,
   and which has MFR falling between 0.1 and 50 g/10 min (at 230° C. under 21.18 N), a melting point (Tm) falling between 150° C. and 167° C., a density falling between 0.895 and 0.910 g/cm³, and a melt tension at 230° C. falling between 1 cN and 20 cN, and wherein the non-halogen flame retardent (B) comprises an ammonium polyphosphate combined with a 1,3,5-triazine derivative of the following general formula

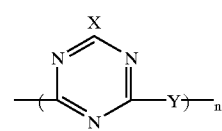

(1)

where X indicates a morpholino group or a piperidino group; Y indicates a divalent residue of piperazine; and n indicates an integer falling between 2 and 50.

2. The flame-retardant polyolefin composition as claimed in claim 1, which has MFR falling between 4 and 50/10 min and which is for injection molding.

3. The flame-retardant polyolefin composition as claimed in claim 1, which has MFR falling between 0.1 and 4 g/10 min and which is for blow molding or extrusion molding.

4. The flame-retardant polyolefin composition as claimed in claim 1, which contains from 12 to 25% by weight, based on the composition, of an ammonium polyphosphate, and from 5 to 10% by weight, based on the composition, of a 1,3,5-triazine derivative of formula (1).

5. The flame-retardant polyolefin composition as claimed in claim 1, wherein the non-halogen flame retardant (B) comprises an ammonium polyphosphate combined with a polyamide.

6. The flame-retardant polyolefin composition as claimed in claim 1, wherein the non-halogen flame retardant (B) comprises an ammonium polyphosphate combined with expandable graphite.

7. The flame-retardant polyolefin composition as claimed in claim 1, wherein the non-halogen flame retardant (B) is an organic phosphate.

8. The flame-retardant polyolefin composition as claimed in claim 1, wherein the non-halogen flame retardant (B) is a combination of an ammonium polyphosphate and an inorganic metal hydrate.

* * * * *